US009838563B2

(12) United States Patent  
Yoshioka

(10) Patent No.: US 9,838,563 B2  
(45) Date of Patent: Dec. 5, 2017

(54) TASK REQUEST MANAGEMENT SYSTEM, TASK REQUEST MANAGEMENT APPARATUS, AND TASK REQUEST MANAGEMENT METHOD

(71) Applicant: Yukiko Yoshioka, Tokyo (JP)

(72) Inventor: Yukiko Yoshioka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/962,419

(22) Filed: Dec. 8, 2015

(65) Prior Publication Data

US 2016/0173708 A1 Jun. 16, 2016

(30) Foreign Application Priority Data

Dec. 11, 2014 (JP) .................................. 2014-251088

(51) Int. Cl.
| | |
|---|---|
| *H04N 1/00* | (2006.01) |
| *G06F 7/16* | (2006.01) |
| *G06F 3/00* | (2006.01) |
| *H04N 1/32* | (2006.01) |
| *G06F 17/24* | (2006.01) |
| *G06F 3/12* | (2006.01) |

(52) U.S. Cl.
CPC ....... *H04N 1/32144* (2013.01); *G06F 17/243* (2013.01); *H04N 2201/3269* (2013.01); *H04N 2201/3271* (2013.01); *H04N 2201/3276* (2013.01)

(58) Field of Classification Search
CPC ............ H04N 1/32144; H04N 1/2166; H04N 1/00366; H04N 1/00376; H04N 1/32112; H04N 1/32771; H04N 1/32778; H04N 2201/3269; H04N 2201/3271; H04N 2201/3276; G06F 17/24; G06F 17/243
USPC ...... 358/1.11–1.18, 400–404, 435, 468, 453; 379/100.07; 382/306, 317, 173, 282; 715/235, 236; 705/28

See application file for complete search history.

(56) References Cited

U.S. PATENT DOCUMENTS 5,267,303 A * 11/1993 Johnson ............. H04N 1/32771  
    358/436  
5,282,052 A * 1/1994 Johnson ................. G06F 17/243  
    358/402

(Continued)

FOREIGN PATENT DOCUMENTS

| JP | 2002-302252 | 10/2002 |
| JP | 2009-006572 | 1/2009 |

*Primary Examiner* — Chad Dickerson  
(74) *Attorney, Agent, or Firm* — IPUSA, PLLC

(57) ABSTRACT

A task request management system includes a creating unit configured to create data of a request form including a code image in which request content information is embedded; a sending unit configured to send an image of the request form to a destination; a first registration unit configured to apply a first status to an image file of the sent request form, and register this image file in a folder in a storage area corresponding to the request content information of the request form; a receiving unit configured to receive an image of a reply document in which information has been added to the request form; and a second registration unit configured to apply a second status to an image file of the received reply document, and register this image file in the folder corresponding to the request content information of the reply document.

6 Claims, 13 Drawing Sheets

| BEFORE PROCESSING | NAME | SECTION NUMBER | REQUEST TYPE | STATUS | TRANS- MISSION TIME AND DATE | RETURN TIME AND DATE | UPDATE TIME AND DATE | REMARKS |
|---|---|---|---|---|---|---|---|---|
| GAS | XY GAS- 20141111153020 | 1 | START GAS | RESPONSE WAIT | 2014/11/11 15:30 | | | |
| SATO | | | | | | | | |
| WATER | | | | | | | | |
| ELEC- TRICITY | | | | | | | | |
| PROCESSED ALREADY | | | | | | | | |

| BEFORE PROCESSING | NAME | SECTION NUMBER | REQUEST TYPE | STATUS | TRANS- MISSION TIME AND DATE | RETURN TIME AND DATE | UPDATE TIME AND DATE | REMARKS |
|---|---|---|---|---|---|---|---|---|
| GAS | XY GAS- 20141111153020 | 2 | START GAS | RESPONDED ALREADY | 2014/11/11 15:30 | 2014/11/12 09:30 | | |
| SATO | | | | | | | | |
| WATER | | | | | | | | |
| ELEC- TRICITY | | | | | | | | |
| PROCESSED ALREADY | | | | | | | | |

(56) References Cited

U.S. PATENT DOCUMENTS

| | | | | |
|---|---|---|---|---|
| 5,448,375 A | * | 9/1995 | Cooper | H04N 1/2166 358/403 |
| 5,465,167 A | * | 11/1995 | Cooper | H04N 1/00366 358/402 |
| 5,745,610 A | * | 4/1998 | Johnson | G06F 17/30265 358/403 |
| 5,859,935 A | * | 1/1999 | Johnson | H04N 1/0084 382/317 |
| 8,239,296 B2 | | 8/2012 | Itoi et al. | |
| 2003/0233292 A1 | * | 12/2003 | Richey | G06Q 10/087 705/28 |
| 2006/0271686 A1 | * | 11/2006 | Sekaran | H04L 12/581 709/227 |
| 2009/0002742 A1 | | 1/2009 | Kasatani | |
| 2009/0106641 A1 | * | 4/2009 | Shinn | H04N 1/00371 715/224 |

\* cited by examiner

FIG.2A

PROPERTY INFORMATION ~31

| PROPERTY NAME | PROPERTY NUMBER | PROPERTY ADDRESS | ROOM NUMBER | BUSINESS OPERATOR NUMBER BY TYPE | ELECTRICITY PLUG OPENING/ CLOSING SCHEDULED DATE | GAS PLUG OPENING/ CLOSING SCHEDULED DATE | WATER PLUG OPENING/ CLOSING SCHEDULED DATE | ... |
|---|---|---|---|---|---|---|---|---|

FIG.2B

BUSINESS OPERATOR INFORMATION ~32

| BUSINESS OPERATOR NAME (COMPANY NAME) | BUSINESS OPERATOR NUMBER | DEPARTMENT IN CHARGE | NAME OF PERSON IN CHARGE | TEL. NO. | FAX NO. | ... |
|---|---|---|---|---|---|---|

FIG.2C

REQUEST FORM FORMAT FILE, REQUEST FORM FILE ~ 41, 42

| FILE NAME | DOCUMENT DATA | ... |

FIG.2D

DOCUMENT INFORMATION ~ 71

| FILE NAME | ICON | SECTION NUMBER | TYPE | STATUS | PROPERTY ||||| IMAGE DATA | ... |
|---|---|---|---|---|---|---|---|---|---|---|---|
| | | | | | TRANSMISSION TIME AND DATE | RETURN TIME AND DATE | UPDATE TIME AND DATE | NAME OF PERSON IN CHARGE | REMARKS | | |

FIG.8

| TARGET TYPE ("ELECTRICITY", "GAS", "WATER", AND SO ON) | BUSINESS OPERATOR NAME | REQUEST TYPE ("START ELECTRICITY", "START GAS", AND SO ON) | CREATION DATE | CREATION TIME AND DATE | NAME OF PERSON IN CHARGE | "REQUEST FORM" | ⋯ |
|---|---|---|---|---|---|---|---|

FIG.10
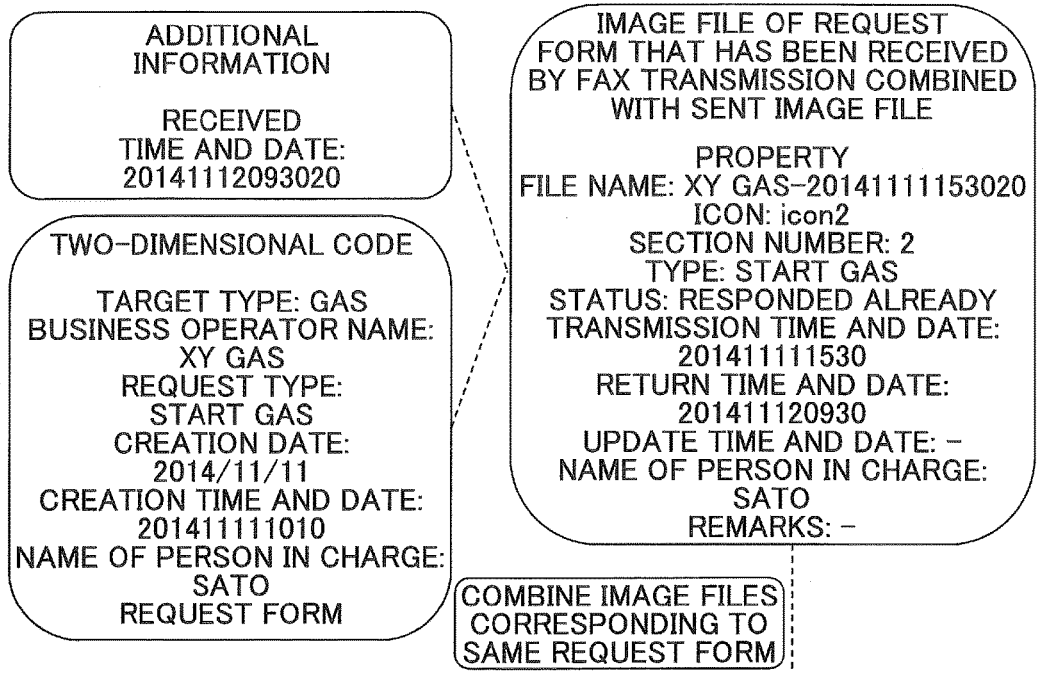
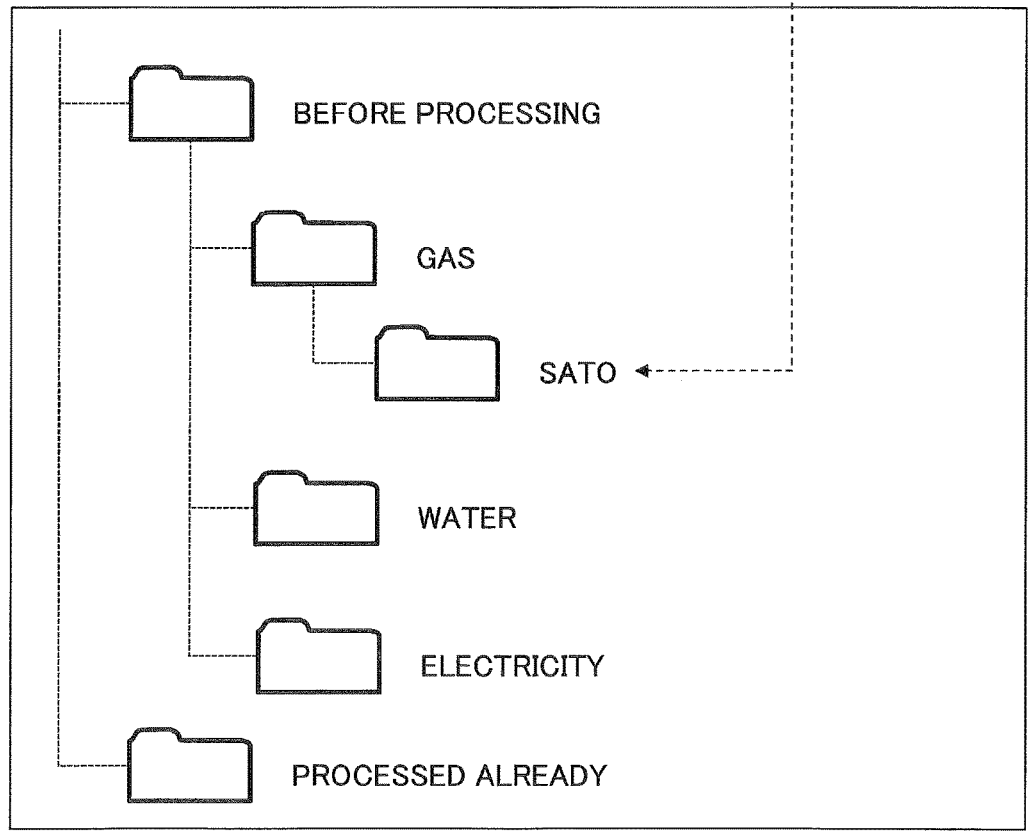

FIG.12

| NAME | SECTION NUMBER | REQUEST TYPE | STATUS | TRANS- MISSION TIME AND DATE | RETURN TIME AND DATE | UPDATE TIME AND DATE | REMARKS |
|---|---|---|---|---|---|---|---|
| ▤ XY GAS- 2014111153020 | 2 | START GAS | RESPONDED ALREADY | 2014/11/11 15:30 | 2014/11/12 09:30 | | |

- BEFORE PROCESSING
  - GAS
    - SATO
  - WATER
  - ELEC- TRICITY
- PROCESSED ALREADY

TASK REQUEST MANAGEMENT SYSTEM, TASK REQUEST MANAGEMENT APPARATUS, AND TASK REQUEST MANAGEMENT METHOD

BACKGROUND OF THE INVENTION

1. Field of the Invention

The present invention relates to a task request management system, a task request management apparatus, and a task request management method.

2. Description of the Related Art

There are many cases where a person in charge at a company requests another person to perform a task, based on a request form that is a paper medium, and the requesting person manages a status as to whether the request has been accepted.

For example, a person in charge at a business operator managing apartments and condominium buildings, sends a request form to an outside business operator by fax, etc., to request a plug opening/closing task for gas, electricity, water, etc., as a tenant moves in to or moves out from a property, and sets the status as "response wait". The person waits for the request form to be returned from the outside business operator, with the scheduled implementation date of the plug opening/closing task written (added) in the form. Then, when the request form is returned, the person confirms that the request has been accepted, and sets the status as "responded already".

Note that a plurality of requests are often included in a single request form. The scheduled implementation dates for all of the requests may not be written in a single reply from the outside business operator, and the responses may be returned by a plurality of replies. In this case, the person in charge needs to confirm the association between the response and the original request form, every time a reply is returned.

Meanwhile, Patent Document 1 discloses a technology of identifying and outputting image information, in response to identification information included in the acquired image information.

As described above, by the conventional task request method, there is a need for space to store request forms, and it is troublesome to associate the original request form with the returned request forms with responses information written in, and the efficiency of managing statuses has been poor.

Patent Document 1: Japanese Laid-Open Patent Publication No. 2009-6572

SUMMARY OF THE INVENTION

The present invention provides a task request management system, a task request management apparatus, and a task request management method, in which one or more of the above-described disadvantages are eliminated.

According to an aspect of the present invention, there is provided a task request management system including a request form creating unit configured to create data of a request form including a code image in which request content information is embedded, based on a request form format and user input information; an image sending unit configured to send an image of the request form to a specified destination; a first image registration unit configured to apply a first status to an image file including the image of the request form sent by the image sending unit, and register the image file including the image of the request form in a folder in a storage area, the folder corresponding to the request content information of the code image included in the request form; an image receiving unit configured to receive an image of a reply document in which information has been added to the request form; and a second image registration unit configured to apply a second status to an image file including the image of the reply document received by the image receiving unit, and register the image file including the image of the reply document in the folder in the storage area, the folder corresponding to the request content information of the code image included in the reply document.

According to an aspect of the present invention, there is provided a task request management apparatus including an image sending unit configured to send an image of a request form to a specified destination, based on data of the request form including a code image in which request content information is embedded, the data being created based on a request form format and user input information; a first image registration unit configured to apply a first status to an image file including the image of the request form sent by the image sending unit, and register the image file including the image of the request form in a folder in a storage area, the folder corresponding to the request content information of the code image included in the request form; an image receiving unit configured to receive an image of a reply document in which information has been added to the request form; and a second image registration unit configured to apply a second status to an image file including the image of the reply document received by the image receiving unit, and register the image file including the image of the reply document in the folder in the storage area, the folder corresponding to the request content information of the code image included in the reply document.

According to an aspect of the present invention, there is provided a task request management method including creating data of a request form including a code image in which request content information is embedded, based on a request form format and user input information; sending an image of the request form to a specified destination; applying a first status to an image file including the image of the request form sent at the sending, and registering the image file including the image of the request form in a folder in a storage area, the folder corresponding to the request content information of the code image included in the request form; receiving an image of a reply document in which information has been added to the request form; and applying a second status to an image file including the image of the reply document received at the receiving, and registering the image file including the image of the reply document in the folder in the storage area, the folder corresponding to the request content information of the code image included in the reply document.

BRIEF DESCRIPTION OF THE DRAWINGS

Other objects, features and advantages of the present invention will become more apparent from the following detailed description when read in conjunction with the accompanying drawings, in which:

FIGS. 2A through 2D illustrate data structure examples of the respective sets of information;

FIG. 8 illustrates an example of information included in a two-dimensional code;

FIG. 10 illustrates an example of registering an image file of a request form that has been received by fax, in a folder;

FIG. 12 illustrates an example of a screen of a folder hierarchy of a request form management server (part 2).

DETAILED DESCRIPTION OF THE PREFERRED EMBODIMENTS

A description is given, with reference to the accompanying drawings, of embodiments of the present invention. Note that a description is given of an operation of requesting an outside business operator to perform a plug opening/closing task for gas, electricity, water, etc., and managing statuses; however, the embodiments are obviously applicable to other operations.

<Configuration>

Figure 1:
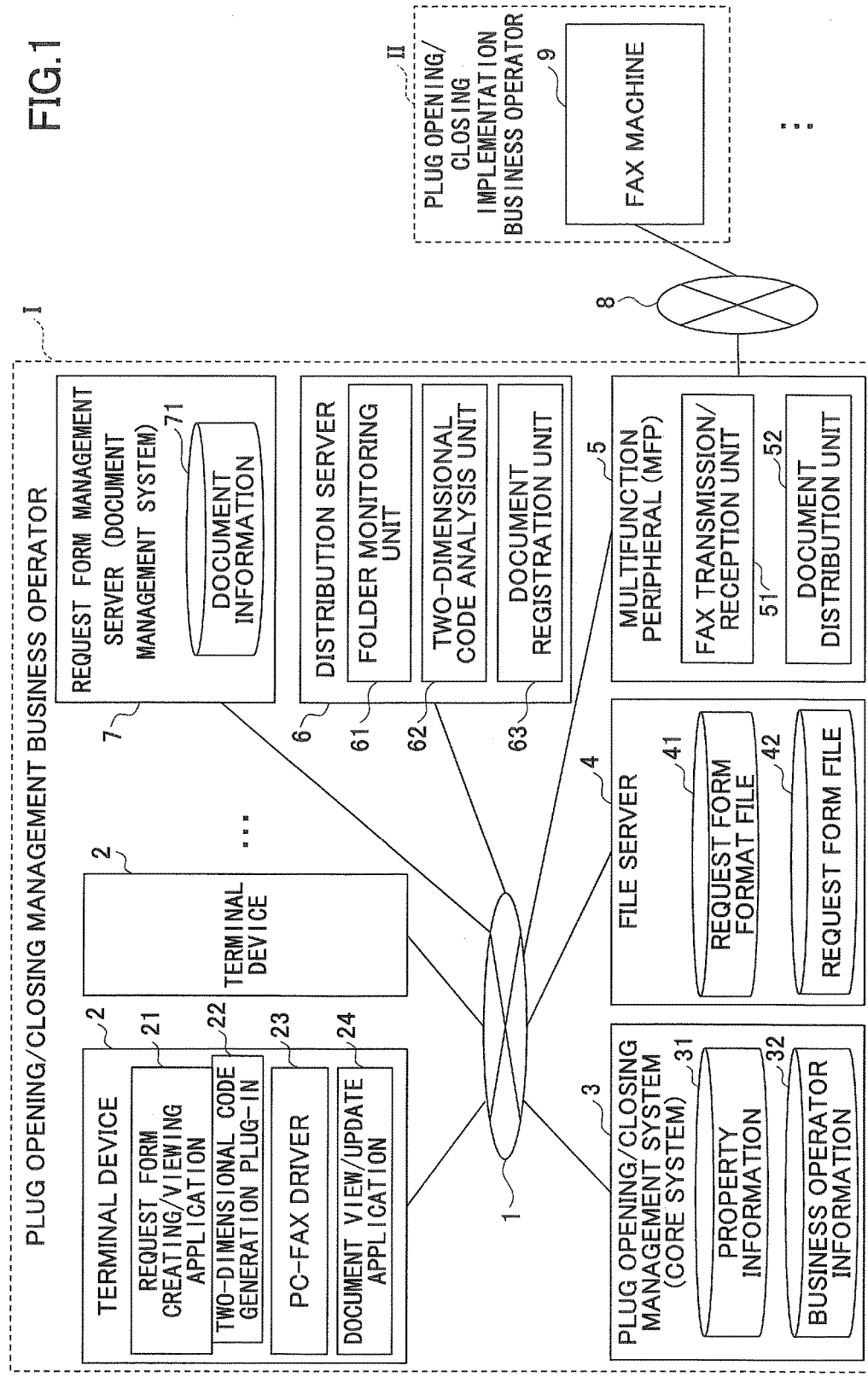
FIG. 1 illustrates a configuration example of a system according to an embodiment of the present invention.

FIG. 1 illustrates a configuration example of a system according to an embodiment of the present invention. In FIG. 1, under the control of a plug opening/closing management business operator I, there are provided a plurality of terminal devices 2, a plug opening/closing management system (core system) 3, a file server 4, a multifunction peripheral (MFP) 5, a distribution server 6, and a request form management server (document management system) 7. These devices are able to perform data communication with each other, by a network 1 such as a LAN (Local Area Network) and a WAN (Wide Area Network). Furthermore, under the control of a plug opening/closing implementation business operator II, there is a fax machine 9, which performs fax transmission/reception with the multifunction peripheral 5 of the plug opening/closing management business operator I via a network 8 such as a public telephone line. Note that "under the control of" means having the authority in performing desired information processing, regardless of the physical installation locations of devices and the ownership of the devices.

The terminal device 2 of the plug opening/closing management business operator I is an information processing apparatus operated by the person in charge of performing the operations of managing plug opening/closing. The terminal device 2 can use a request form creating/viewing application (application program) 21 to which a two-dimensional code generation plug-in 22 is applied, a PC-FAX driver 23, and a document view/update application 24. When a request form is created by the request form creating/viewing application 21, the two-dimensional code generation plug-in 22 generates a two-dimensional code based on information set in the request form (file name, etc.) and information input to a predetermined position in the request form, and adds the two-dimensional code to the request form.

The PC-FAX driver 23 causes the destination, etc., to be set, with respect to the request form open in the request form creating/viewing application 21, and sends the request form by fax from the multifunction peripheral 5. The document view/update application 24 makes it possible to view the folder hierarchy and the file contents (fax transmission reception images, property, etc.) of document information 71 of the request form management server 7.

The plug opening/closing management system 3 is for managing information of the properties that are targets of plug opening/closing and the plug opening/closing implementation business operator implementing the plug opening/closing. The plug opening/closing management system 3 holds property information 31 and business operator information 32. The file server 4 holds document templates (document formats), the created request form, etc., needed for operations. The file server 4 holds a request form format file 41 and a request form file 42. Note that the plug opening/closing management system 3 and the file server 4 may be included in a single body.

The multifunction peripheral 5 includes a fax transmission/reception unit 51 and a document distribution unit 52. The fax transmission/reception unit 51 performs fax transmission of an electronic document received from the terminal device 2, etc., as a PC-FAX. The document distribution unit 52 distributes the fax image received from the fax transmission/reception unit 51 to a predetermined folder (inside the multifunction peripheral 5 or any storage area that can be accessed).

The distribution server 6 monitors a predetermined folder to which the document distribution unit 52 of the multifunction peripheral 5 distributes an image file, and performs a predetermined process when a file is input to the monitored folder. The distribution server 6 includes a folder monitoring unit 61, a two-dimensional code analysis unit 62, and a document registration unit 63. The folder monitoring unit 61 monitors whether a file is input to a folder set in advance. The two-dimensional code analysis unit 62 analyzes the two-dimensional code (analyze and extract embedded information) that is set to be appended to a predetermined position in the document of the input file. The document registration unit 63 registers the file input to the folder, in a folder in the request form management server 7, according to an extraction result of a two-dimensional code (including the case where a two-dimensional code is not recognized). Note that the distribution server 6 may be included in a single body together with the multifunction peripheral 5.

The request form management server 7 is for managing image files including images of request forms sent and received by fax, together with management information. The request form management server 7 holds the document information 71.

The fax machine 9 of the plug opening/closing implementation business operator II is assumed to perform fax transmission and reception by a paper medium (scan a paper medium and send the contents obtained by the scanning, and outputting received contents onto paper).

FIGS. 2A through 2D illustrate data structure examples of the respective sets of information, which are property information 31, business operator information 32, a request form format file 41, a request form file 42, and document information 71, respectively. Note that the data items held in the information are not limited to those illustrated in FIGS. 2A through 2D.

The property information 31 includes items of "property name", "property number", "property address", "room number", "business operator number by type", "electricity plug opening/closing scheduled date", "gas plug opening/closing scheduled date", "water plug opening/closing scheduled date", etc. The "property name" is the name of the property such as the apartment name and the condominium building name. The "property number" is information identifying a property. The "property address" is the address of the property. The "room number" is information identifying the room belonging to the property. The "business operator number by type" is information (may be plural) identifying the plug opening/closing implementation business operator in charge of each type of the utilities such as gas, electricity, water, etc. of the property. The "electricity plug opening/closing scheduled date" is the date on which plug opening/closing of electricity is scheduled (plug opening scheduled date, plug closing scheduled date). The "gas plug opening/closing scheduled date" is the date on which plug opening/closing of gas is scheduled. The "water plug opening/closing scheduled date" is the date on which plug opening/closing of water is scheduled.

Note that in the present embodiment, it is assumed that the statuses are managed until a response indicating the scheduled date is received from the plug opening/closing implementation business operator; however, additional items of "electricity plug opening/closing implementation date (plug opening implementation date, plug closing implementation date)", "gas plug opening/closing implementation date", and "water plug opening/closing implementation date" may be set, and the "electricity plug opening/closing implementation date", the "gas plug opening/closing implementation date", and the "water plug opening/closing implementation date" may be recorded upon receiving a report that the implementation of plug opening/closing has been completed from the plug opening/closing implementation business operator.

The business operator information 32 includes items of "business operator name (company name)", "business operator number", "department in charge", "name of person in charge", "tel. no.", "fax no.", etc. The "business operator name (company name)" is the name of the plug opening/closing implementation business operator. The "business operator number" is information identifying the plug opening/closing implementation business operator. The "department in charge" is the name of the department of the plug opening/closing implementation business operator, in charge of receiving requests. The "name of person in charge" is the name of the person at the plug opening/closing implementation business operator, in charge of receiving requests. The "tel. no." is the telephone number of the department or the person at the plug opening/closing implementation business operator, in charge of receiving requests. The "fax no." is the fax number of the department or the person at the plug opening/closing implementation business operator, in charge of receiving requests.

The request form format file 41 and the request form file 42 include items of "file name", "document data", etc. The "file name" is the name of the file. The "document data" is the data describing the document contents. The request form format file 41 and the request form file 42 are created in a format of, for example, MS-EXCEL (registered trademark).

The document information 71 includes "property" and "image data". The "property" includes "file name", "icon", "section number", "type", "status", "transmission time and date", "return time and date", "update time and date", "name of person in charge", "remarks", etc. The "file name" is the name of the file. The "icon" is a symbol that is displayed. In the present embodiment, it is assumed that when the there is only the image data of the sent request form, the icon is a drawing of one piece of paper, and when a plurality of image data items of the returned request forms are combined, the icon is a drawing of a plurality of pieces of paper. The "section number" is the number of sections into which the image data is divided. When there is only the image data of the sent request form, the "section number" is one, and every time an image data item of the returned request form is combined, the "section number" is incremented by one.

The "type" is the type (gas, electricity, water, etc.) of the utilities that is the target of plug opening/closing. The "status" is the state of the request. When the request form is sent by fax, the "status" is "response wait". When the request form in which a response is additionally written is received by fax, the "status" becomes "responded already". The "transmission time and date" is the time and date on which the request form is sent by fax. The "return time and date" is the time and date on which the request form in which a response is additionally written is received by fax. The "update time and date" is the time and date of the final update, such as combining the image data items. The "name of person in charge" is the name of the person in charge on the request form issuing side. The "remarks" are additional information.

Figure 3:
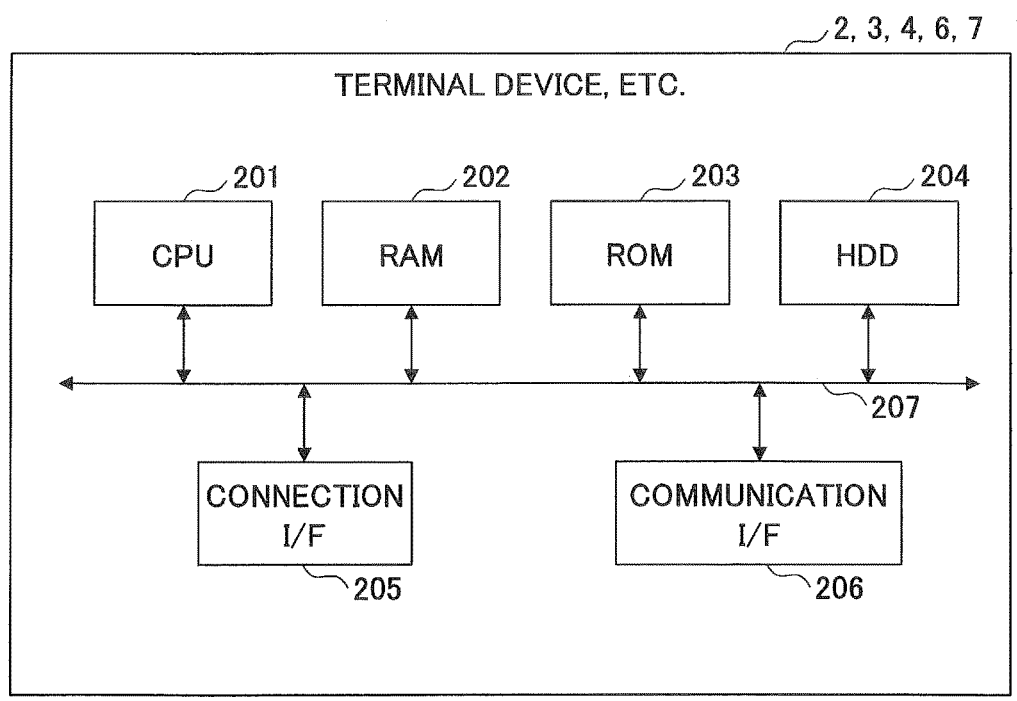
FIG. 3 illustrates a hardware configuration example of a terminal device, etc.

FIG. 3 illustrates a hardware configuration example of the terminal device 2, etc. (the terminal device 2, the plug opening/closing management system 3, the file server 4, the distribution server 6, and the request form management server 7). In FIG. 3, the terminal device 2, etc. includes a CPU (Central Processing Unit) 201, a RAM (Random Access Memory) 202, a ROM (Read Only Memory) 203, a HDD (Hard Disk Drive) 204, a connection I/F (Interface) 205, and a communication I/F 206, which are interconnected by a bus 207. The CPU 201 implements overall control on the operations of the document view/update application 24, by executing programs stored in the ROM 203, the HDD 204, etc., by using the RAM 202 as a work area. The connection I/F 205 is an interface between the terminal device 2, etc., and a device connected to the terminal device 2, etc. The communication I/F 206 is an interface for performing communication with other information processing apparatuses via the network 1 (FIG. 1).

Figure 4:
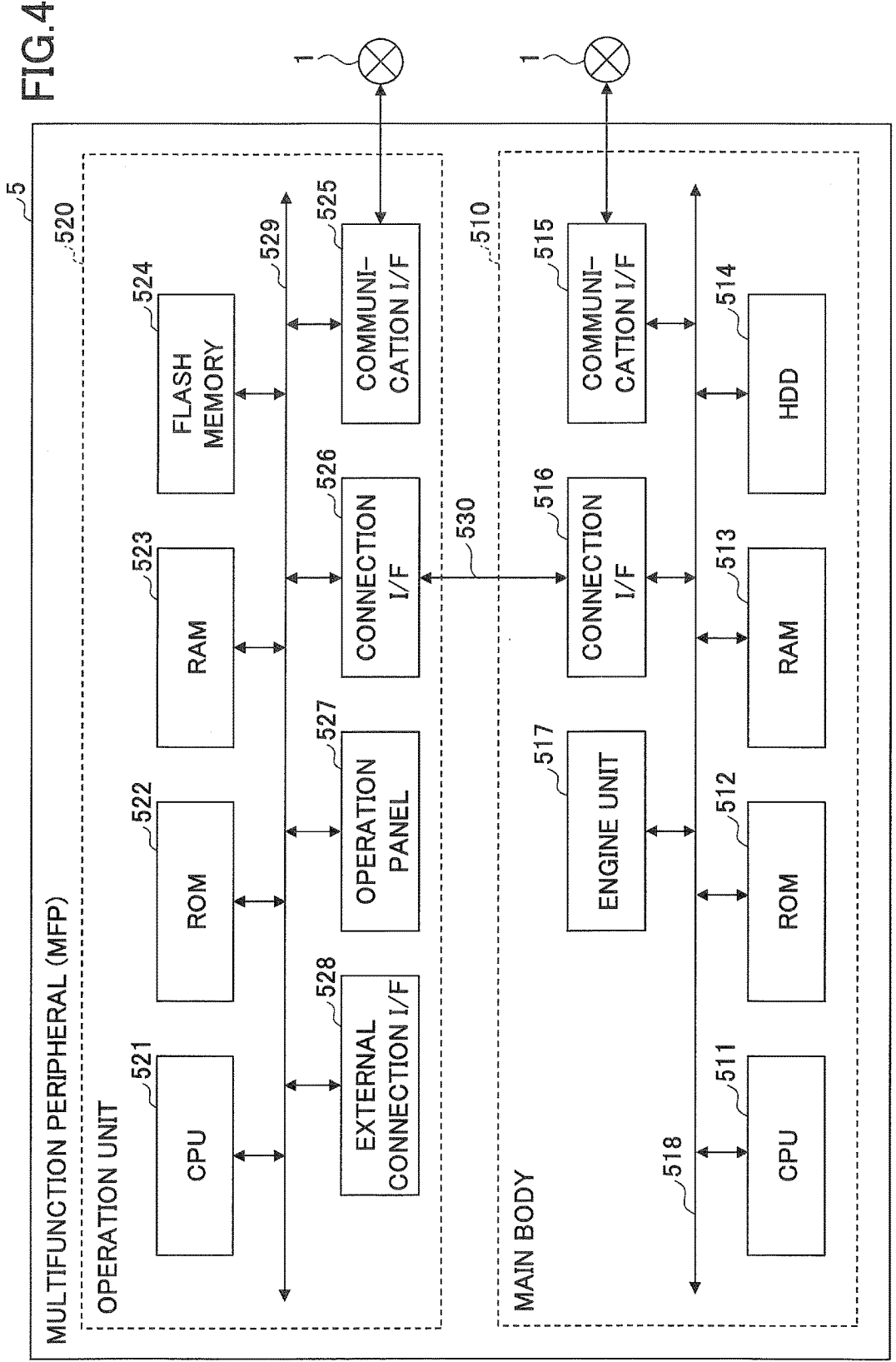
FIG. 4 illustrates a hardware configuration example of a multifunction peripheral.

FIG. 4 illustrates a hardware configuration example of the multifunction peripheral 5. In FIG. 4, the multifunction peripheral 5 includes a main body 510 that can implement various functions such as a copy function, a scanner function, a fax function, a printer function, etc., and an operation unit 520 for receiving operations of the user. The main body 510 and the operation unit 520 are communicatively connected to each other via an exclusive-use communication channel 530. As the communication channel 530, for example, a communication channel of a USB (Universal Serial Bus) standard may be used; however, a wired or wireless communication channel of any standard may be used. Note that the main body 510 can perform operations according to operations received at the operation unit 520. Furthermore, the main body 510 can communicate with external devices such as a client PC (personal computer), and can perform operations according to instructions received from the external device.

The main body 510 includes CPU 511, a ROM 512, a RAM 513, a HDD 514, a communication I/F 515, a connection I/F 516, and an engine unit 517, which are interconnected via a system bus 518.

The CPU 511 implements overall control on the operations of the main body 510. The CPU 511 controls the operations of the entire main body 510, by executing programs stored in the ROM 512 or the HDD 514, etc., by using the RAM 513 as the work area, and implements various functions such as the copy function, the scanner function, the fax function, the print function, etc., described above. The communication I/F 515 is an interface for connecting with the network 1. The connection I/F 516 is an interface for communicating with the operation unit 520 via the communication channel 530. The engine unit 517 is a hardware element for performing general-purpose information processing and processes other than communication, for implementing the copy function, the scanner function, the fax function, and the print function. For example, the engine unit 517 includes a scanner (image reading unit) for scanning and reading an image of an original document, a plotter (image forming unit) for printing the image onto a sheet material, etc., a fax unit for performing fax communication, etc. The fax unit is connected to a network 8 such as a public telephone line, etc. Furthermore, the engine unit 517 may include certain options such as a finisher for sorting the sheet materials that have undergone printing and an ADF (Automatic Document Feeder) for automatically feeding original documents.

The operation unit 520 includes a CPU 521, a ROM 522, a RAM 523, a flash memory 524, a communication I/F 525, a connection I/F 526, an operation panel 527, and an external connection I/F 528, which are interconnected by a system bus 529. The CPU 521 implements overall control on the operations of the operation unit 520. The CPU 521 controls the operations of the entire operation unit 520, by executing programs stored in the ROM 522 or the flash memory 524, etc., by using the RAM 523 as the work area, and implements various functions such as displaying information (images) according to input received form the user. The communication I/F 525 is an interface for connecting with the network 1. The connection I/F 526 is an interface for communicating with the main body 510 via the communication channel 530. The operation panel 527 receives various inputs according to operations of the user, and displays various kinds of information (for example, information according to received operations, information indicating the operation status of the multifunction peripheral 5, information indicating the setting state, etc.). Furthermore, in addition, or alternatively, an operation unit including hardware keys, etc., and a display unit such as a lamp, may be provided. The external connection I/F 528 is an interface for connecting with a device such as an IC card reader.

<Operations>

Figure 5:
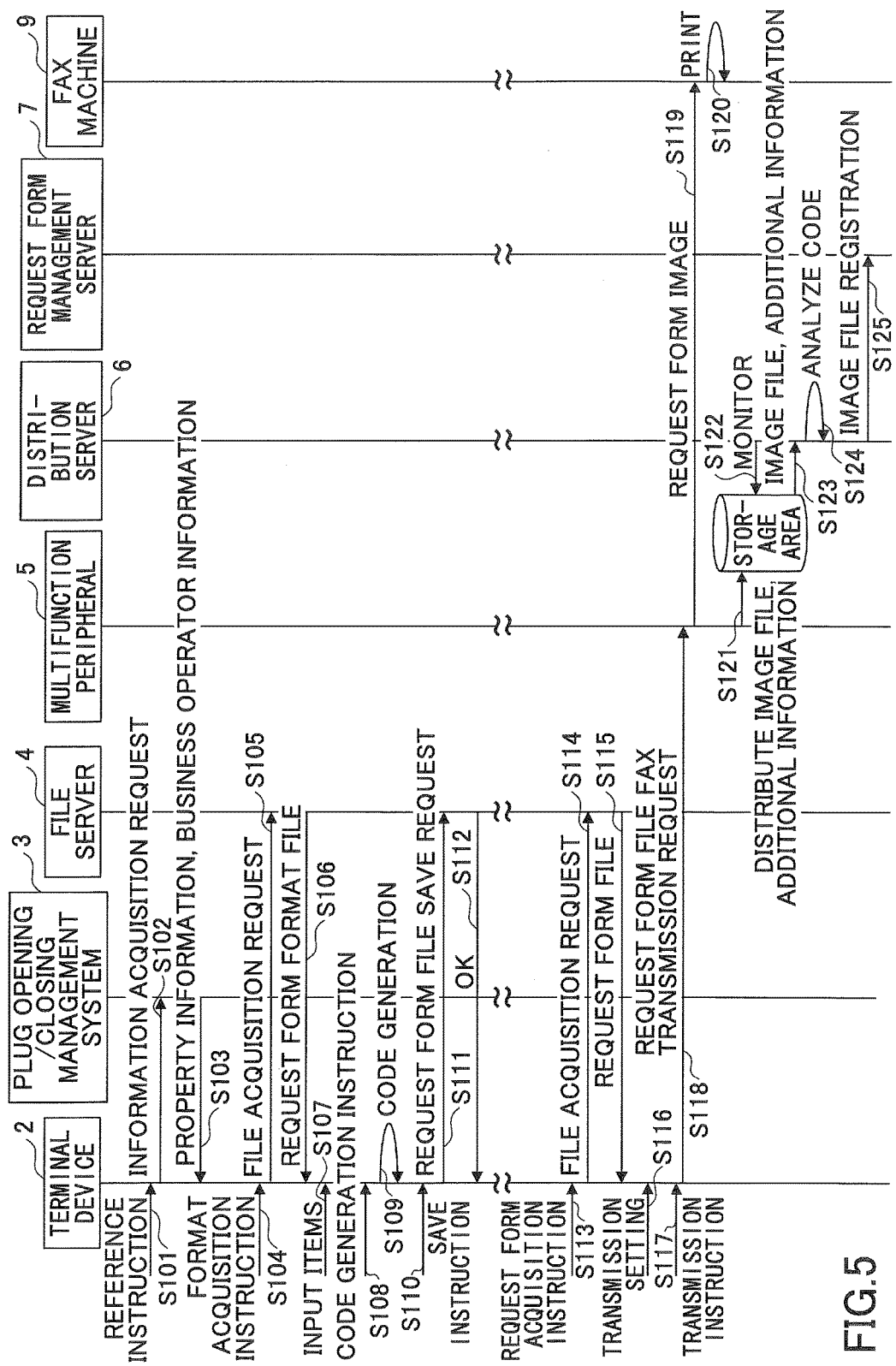
FIG. 5 is a sequence diagram illustrating a process example according to the embodiment (part 1)
Figure 6:
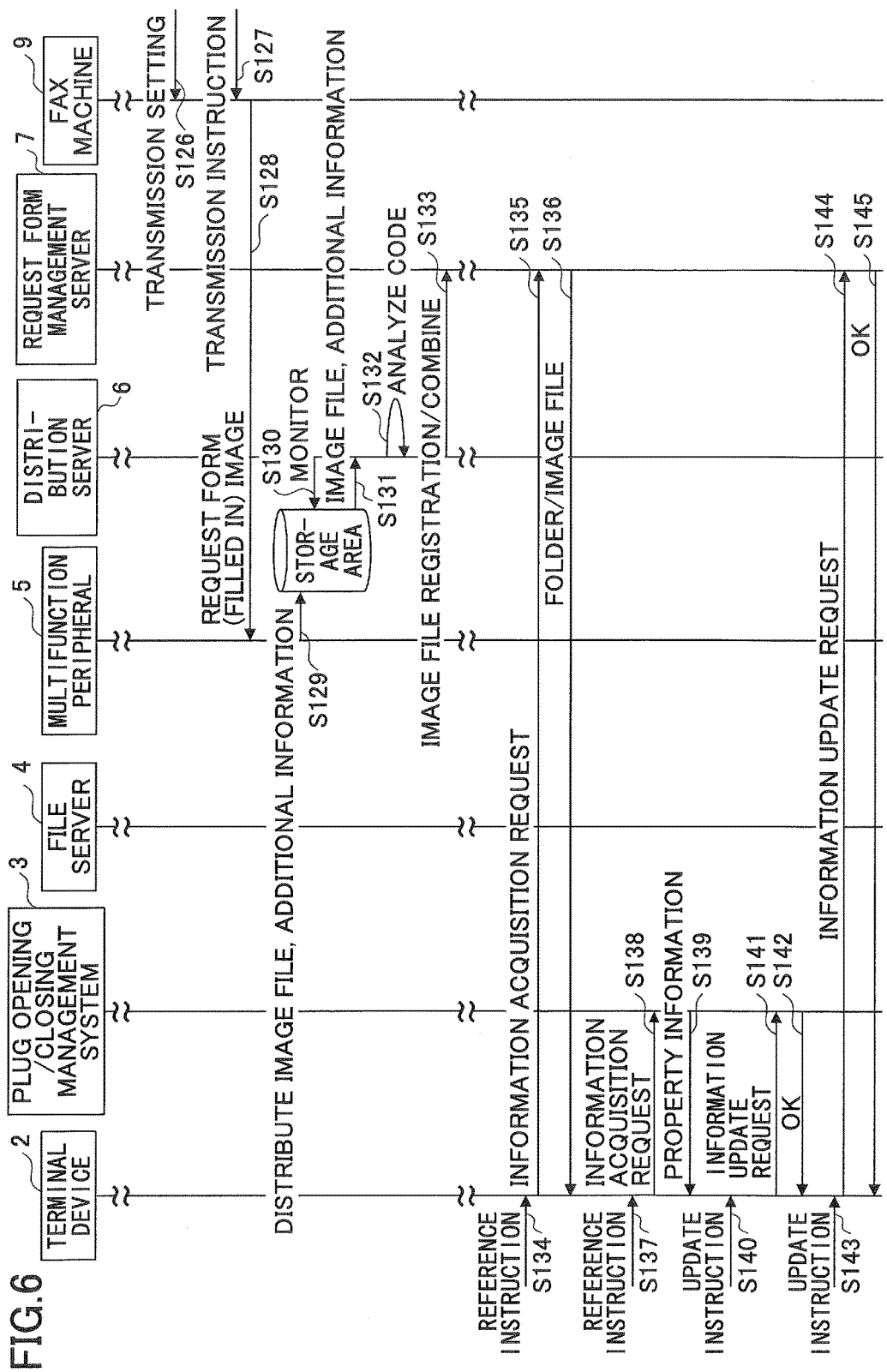
FIG. 6 is a sequence diagram illustrating a process example according to the embodiment (part 2)

FIGS. 5 and 6 are sequence diagrams illustrating process examples according to the above embodiment. In FIG. 5, when the person in charge at the plug opening/closing management business operator I creates a request form, the person in charge performs an operation of instructing to refer to the property information and the business operator information to the terminal device 2 (including inputting search conditions of a property) (step S101), and the terminal device 2 makes an information acquisition request to the plug opening/closing management system 3 (step S102). Upon receiving this request, the plug opening/closing management system 3 refers to the property information 31 and the business operator information 32, and returns the corresponding property information and business operator information (step S103).

Next, when the person in charge gives a format acquisition instruction to the terminal device 2 (including specifying the request type) (step S104), the terminal device 2 makes a file acquisition request to the file server 4 (step S105). Upon receiving this request, the file server 4 refers to the request form format file 41, and returns the specified request form format file (step S106).

The person in charge opens the request form format file by the request form creating/viewing application 21, and inputs predetermines items by referring to the property information and the business operator information that have been referred to beforehand (step S107). When the person in charge finishes inputting a series of items, and gives a code generation instruction (step S108), the two-dimensional code generation plug-in 22 generates a two-dimensional code (code image), and arranges the two-dimensional code in the request form (step S109). In the two-dimensional code generation plug-in 22, a reference position (the cell position, etc., in the case of a spreadsheet application) of information to be embedded in the two-dimensional code, is set in advance for each request form format. For example, the present time (acquire by a function Now ( ), etc.) is used for generating the two-dimensional code.

Figure 7:
FIG. 7 illustrates an example of a request form.

FIG. 7 illustrates an example of a request form, which is an example of a request form of "gas start request". The illustrated request form includes information of the plug opening/closing implementation business operator that is the request destination (top left field), information of the plug opening/closing management business operator that is the request source (top right field), information of the property, the room number, etc. of the target of plug opening/closing (middle stage), and the two-dimensional code (bottom left field). In this format, a plurality of properties and room numbers of targets of plug opening/closing can be written in. The plug opening/closing implementation business operator that has received the request form writes in the "scheduled implementation date" in the response field for each of the room numbers (middle stage), writes the signature, etc., of the person in charge in the confirmer field (bottom right field), and then returns the request form.

FIG. 8 illustrates an example of information included in the two-dimensional code, which includes items such as "target type ("electricity", "gas", "water", and so on)", "business operator name", "request type ("start electricity", "start gas", and so on), "creation date", "creation time and date", "name of person in charge", "request form", etc.

Referring back to FIG. 5, subsequently, the person in charge instructs to save the request form (step S110), the terminal device 2 requests the plug opening/closing management system 3 to save the request form file (step S111), the file server 4 saves the request form file as the request form file 42, and when the file is normally saved, the file server 4 returns a message (OK) indicating that effect (step S112).

Subsequently, the same person in charge who created the request form, or another person in charge in the case where the role is shared, performs an operation of instructing to acquire the request form to the terminal device 2 (step S113), and the terminal device 2 makes a request to acquire the request form file to the file server 4 (step S114). Upon receiving this request, the file server 4 refers to the request form file 42 and returns the request form file (step S115).

When the person in charge determines that the request form file can be sent by fax to the plug opening/closing implementation business operator upon viewing the request form with the request form creating/viewing application 21, the person in charge makes a transmission setting by a setting screen provided by the PC-FAX driver 23 (step S116), and gives a transmission instruction (step S117). Accordingly, the terminal device 2 makes a fax transmission request for sending the request form file, to the multifunction peripheral 5 (step S118), and the multifunction peripheral 5 sends a request form image to the fax machine 9 of the plug opening/closing implementation business operator II specified as the destination, by the fax transmission/reception unit 51 (step S119). The fax machine 9 prints the request form on a paper sheet (step S120), and the plug opening/closing implementation business operator II confirms the request form and writes a response, etc., in the request form.

Meanwhile, the multifunction peripheral 5 distributes, by the document distribution unit 52, an image file including an image of the request form that has been sent by fax, together with additional information such as the fax transmission time and date, to a folder in a predetermined storage area (step S121). The folder that is the distribution destination may be in a storage area inside the multifunction peripheral 5 or in any accessible storage area in the network.

The folder monitoring unit 61 of the distribution server 6 monitors the folder that is the distribution destination in the document distribution unit 52 of the multifunction peripheral 5 (step S122), and acquires a new image file together with additional information, when input of a new image file is detected (step S123). Then, the two-dimensional code analysis unit 62 analyzes a two-dimensional code that is going to be located at a predetermined position in the image of the request form (step S124), and extracts the embedded information. Then, the distribution server 6 sets, by the document registration unit 63, the properties of the image file according to the extraction result of the two-dimensional code (including the case where a two-dimensional code is not recognized) and the additional information, and registers the image file in a predetermined folder in the request form management server 7 (step S125).

Figure 9:
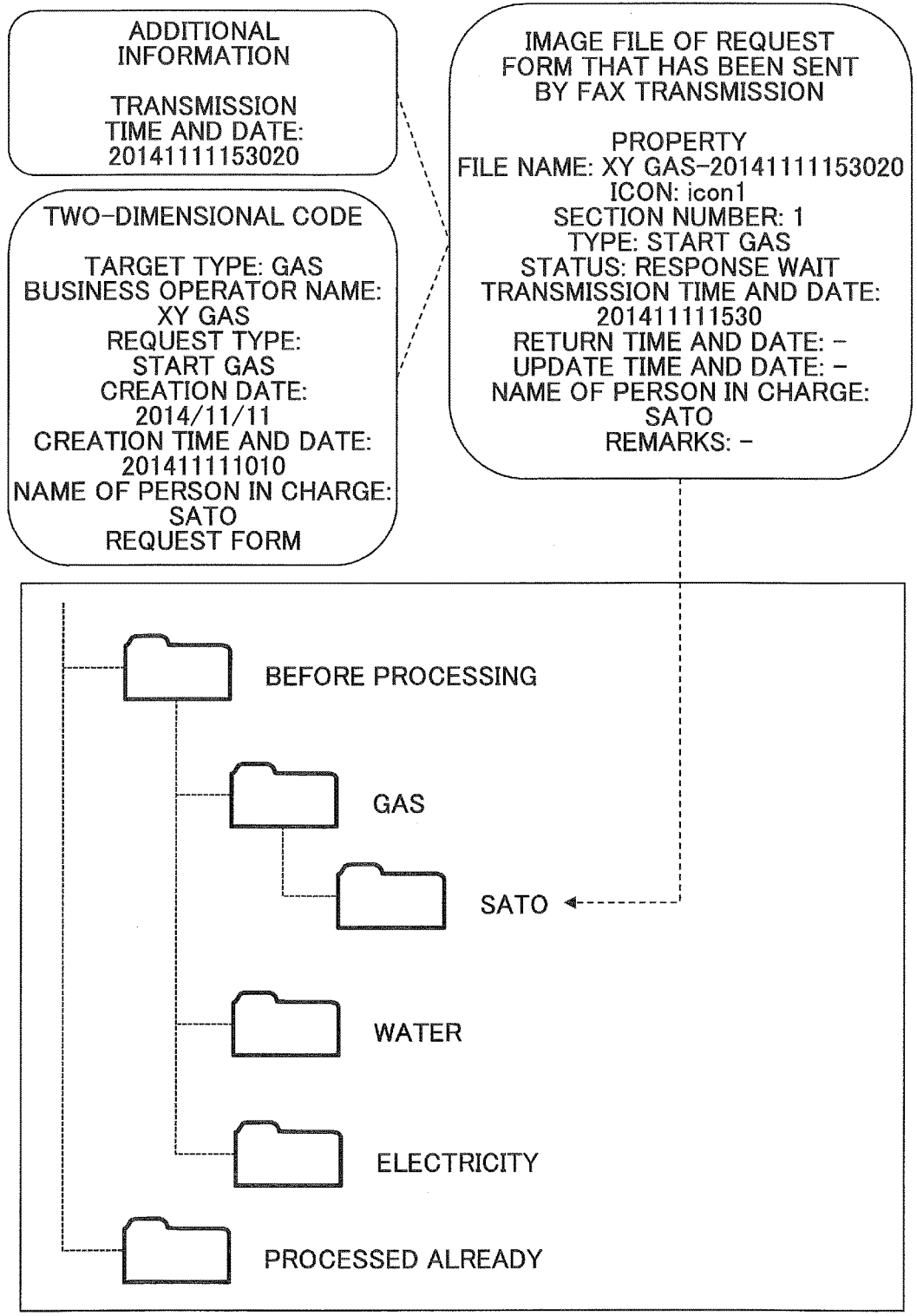
FIG. 9 illustrates an example of registering an image file of a request form that has been sent by fax, in a folder.

FIG. 9 illustrates an example of registering the image file of the request form that has been sent by fax, in a folder. In the illustrated example, the properties of the image file are set based on the transmission time and date of the additional information and the extraction result of the two-dimensional code; in this case, there is only the image file that has been sent by fax, and therefore "icon1" indicating that there is one image is set as the icon, "1" is set as the section number, and "response wait" is set as the status. Then, the image file is registered in the "Sato" folder that is the name of the corresponding person in charge, which is at a lower level than the "gas" folder indicating the type, which is at a lower level than the "before processing" folder, which are created in advance. Note that when there is no folder at a lower level than the "before processing" folder, the image file is registered upon creating a new folder. When a two-dimensional code is not recognized in the image file, the image file is registered in a predetermined folder.

Next, in FIG. 6, on the side of the plug opening/closing implementation business operator II that has received the request form by fax, after the request form is confirmed and a response, etc., is written in, a transmission setting is made in the fax machine 9 (step S126), and a transmission instruction is given (step S127). Accordingly, the fax machine 9 sends the image of the request form, in which a response, etc., has been written in, to the multifunction peripheral 5 of the plug opening/closing management business operator I (step S128).

The multifunction peripheral 5 distributes, by the document distribution unit 52, the image file of the request form received by fax, in which a response, etc., has been written in, together with additional information such as the fax reception time and date, to a folder in a predetermined storage area (step S129).

The folder monitoring unit 61 of the distribution server 6 monitors the folder that is the distribution destination in the document distribution unit 52 of the multifunction peripheral 5 (step S130), and acquires a new image file together with the additional information, when input of a new image file is detected (step S131). Then, the two-dimensional code analysis unit 62 analyzes a two-dimensional code that is going to be located at a predetermined position in the image of the request form (step S132), and extracts the embedded information. Then, the distribution server 6 sets, by the document registration unit 63, the properties of the image file according to the extraction result of the two-dimensional code (including the case where a two-dimensional code is not recognized) and the additional information, and registers the image file in a predetermined folder in the request form management server 7 (step S133). Note that in a case of fax reception, when the folder already includes an image file with respect to the same request form (determine from properties), the two image files are combined, and the status is changed to "responded already" if the status is "response wait". Note that when it is determined by performing image processing, whether a response, etc., has been written into the response field of the request form that has been received by fax, and nothing is written in the response field, the status may be maintained at "response wait".

FIG. 10 illustrates an example of registering the image file of the request form that has been received by fax, in a folder. In the illustrated example, the properties of the image file are set based on the reception time and date of the additional information and the extraction result of the two-dimensional code; in this case, this is a fax reception, and therefore the image file is combined with the image file at the time of fax transmission that is already included in the corresponding "Sato" folder, "icon2" indicating that there are a plurality of images is set the icon, "2" is set as the section number, and "responded already" is set as the status. Then, the image file is registered in the same "Sato" folder that is the name of the corresponding person in charge, which is at a lower level than the "gas" folder indicating the type, which is at a lower level than the "before processing" folder.

Referring back to FIG. 6, subsequently, the same person in charge who created the request form and sent the request form by fax, or another person in charge in the case where the role is shared, performs an operation of instructing to refer to the request form to the terminal device 2 (step S134), and the terminal device 2 makes a request to acquire the information to the request form management server (step S135). Upon receiving this request, the request form management server 7 refers to the document information 71 and returns the information of the folder and the image file (step S136).

Figure 11:
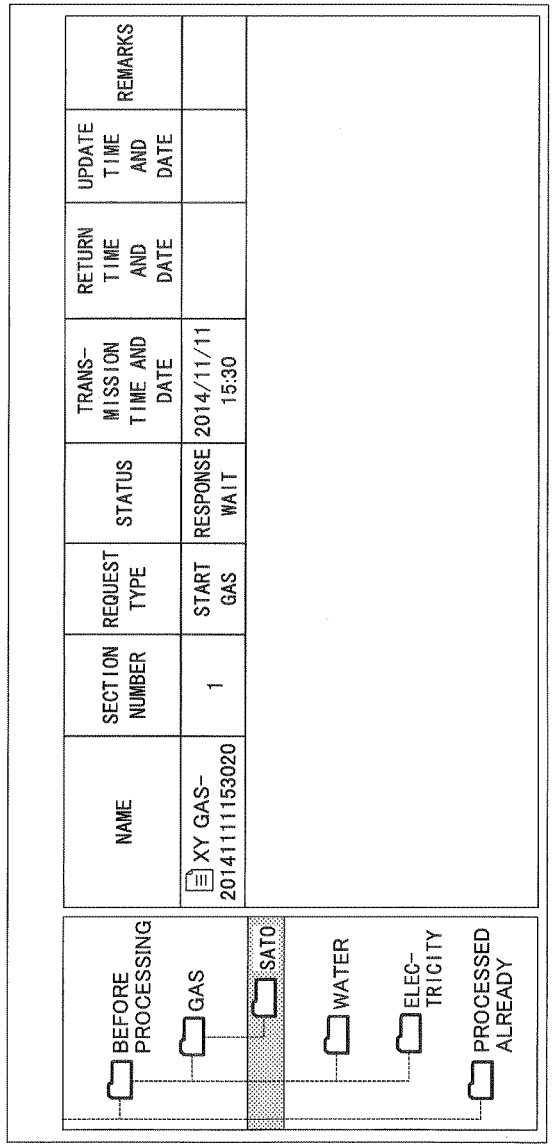
FIG. 11 illustrates an example of a screen of a folder hierarchy of a request form management server (part 1)

FIG. 11 illustrates an example of a screen of a folder hierarchy of the request form management server 7. FIG. 11 illustrates a state where the "Sato" folder, which is below the "before processing" folder→"gas" folder, is selected. The illustrated example indicates a state where only the image file that has been sent by fax is registered, immediately after sending the request form by fax, and therefore the icon indicates that there is one image, the section number is "1", and the status is "response wait". FIG. 12 illustrates a state where a response to the request form is received by fax, with respect to the request form sent by fax, and the icon indicates that there are a plurality of images, the section number is "2", and the status is "responded already". Furthermore, by specifying an image file from the screen of FIGS. 11 and 12, it is possible to display the image of the request form on the screen.

Referring back to FIG. 6, when the person in charge performs an operation to instruct to refer to the property information with respect to the terminal device 2 (including inputting search conditions of a property (step S137), the terminal device 2 makes an information acquisition request to the plug opening/closing management system 3 (step S138). Upon receiving this request, the plug opening/closing management system 3 refers to the property information 31, and returns the corresponding property information (step S139).

The person in charge looks at the response in the request form sent form the plug opening/closing implementation business operator, and gives an instruction to update the plug opening/closing scheduled date in the property information in the plug opening/closing management system 3 (step S140), and the terminal device 2 makes an information acquisition request to the plug opening/closing management system 3 (step S141) Upon receiving this request, the plug opening/closing management system 3 updates the information, and when the information is normally updated, the plug opening/closing management system 3 returns a message (OK) indicating that effect (step S142).

Next, when the person in charge performs an operation to instruct the update of the stored image file of the request form to the terminal device 2 (step S143), the terminal device 2 makes an information update request to the request form management server 7 (step S144). Upon receiving this request, the request form management server 7 updates the information, and when the information is normally updated, the request form management server 7 returns a message (OK) indicating that effect (step S145). Specifically, when responses from the plug opening/closing implementation business operator have been obtained with respect to all plug opening/closing requests (in units of room numbers) included in a single request form, and the responses have been applied to the plug opening/closing management system 3, an operation is performed to move the corresponding images files to the "processed already" folder.

<Extension Example>

In the above embodiment, the operation of applying the responses from the plug opening/closing implementation business operator to the plug opening/closing management system 3, and the subsequent operation of moving the image files to the "processed already" folder, are performed according to the operations by the person in charge; however, these processes may be performed automatically.

For example, by performing character recognition on the response, etc., written into the response field of the request form, or by applying an answer sheet format in consideration of recognition precision, it is possible to extract the information in the response field from the image of the request form received by fax, automatically update the information with respect to the plug opening/closing management system 3 according to the extraction results, and automatically move the image files that have been processed to the "processed already" folder.

Furthermore, the completion of the plug opening/closing may also be managed in the plug opening/closing management system 3, the request form in which the completion date has been additionally written may be returned from the plug opening/closing implementation business operator, and the automatic updating as described above may be applied.

Furthermore, in the plug opening/closing management system 3, the preferred date for plug opening/closing may be managed, and when the scheduled date or completion date of plug opening/closing are not set within a predetermined time period from the preferred date, an alert may be generated for the operator.

<Overview>

As described above, according to the present embodiment, it is possible to eliminate the need for space to store request forms, and to perform status management in an efficient manner.

The task request management system, the task request management apparatus, and the task request management method are not limited to the specific embodiments described herein, and variations and modifications may be made without departing from the spirit and scope of the present invention. That is, the present invention is not to be construed as being limited by the details of the specific examples and the accompanying drawings.

<Correspondence of Terms>

The request form creating/viewing application 21 is an example of a "request form creating unit". The fax transmission/reception unit 51 is an example of an "image sending unit". The document registration unit 63 is an example of a "first image registration unit". The fax transmission/reception unit 51 is an example of an "image receiving unit". The document registration unit 63 is an example of a "second image registration unit". The document registration unit 63 is an example of a "combining unit".

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor f readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Patent Application No. 2014-251088, filed on Dec. 11, 2014, the entire contents of which are hereby incorporated herein by reference.

What is claimed is:

1. A task request management system comprising:
   hardware processors; and
   hardware memories containing instructions, which when executed, cause the hardware processors to:
   create data of a request form including a code image in which request content information is embedded, based on a request form format and user input information;

send an image of the request form to a specified destination;
apply a first status to an image file including the sent image of the request form, and register the image file including the image of the request form in a folder in a storage area, the folder corresponding to the request content information of the code image included in the request form;
receive an image of a reply document in which information has been added to the request form; and
apply a second status to an image file including the received image of the reply document, and register the image file including the image of the reply document in the folder in the storage area, the folder corresponding to the request content information of the code image included in the reply document;
combine two image files, when the image file including the image of the reply document is registered in the folder and the folder already includes the image file with the code image including the same request content information as the request content information included in the code image of the image file to be registered;
when the image file including the image of the request form is registered in the folder, set a response wait status in a property of the image file to be registered, and
when the image file including the image of the reply document is registered in the folder,
set a responded already status in a property of the combined image files, when there is information added to a predetermined response field in the image of the reply document, and
set a response wait status in a property of the combined image files, when there is no information added to the predetermined response field in the image of the reply document.

2. The task request management system according to claim 1, wherein the instructions, when executed, cause the hardware processors to:
when the image file including the image of the request form is registered in the folder, sets a response wait status in a property of the image file to be registered, and
when the image file including the image of the reply document is registered in the folder, set a responded already status in a property of the combined image files.

3. A task request management apparatus comprising:
hardware processors; and
hardware memories containing instructions, which when executed, cause the hardware processors to:
send an image of a request form to a specified destination, based on data of the request form including a code image in which request content information is embedded, the data being created based on a request form format and user input information;
apply a first status to an image file including the sent image of the request form, and register the image file including the image of the request form in a folder in a storage area, the folder corresponding to the request content information of the code image included in the request form;
receive an image of a reply document in which information has been added to the request form; and
apply a second status to an image file including the received image of the reply document, and register the image file including the image of the reply document in the folder in the storage area, the folder corresponding to the request content information of the code image included in the reply document;
combine two image files, when the image file including the image of the reply document is registered in the folder and the folder already includes the image file with the code image including the same request content information as the request content information included in the code image of the image file to be registered;
when the image file including the image of the request form is registered in the folder, set a response wait status in a property of the image file to be registered, and
when the image file including the image of the reply document is registered in the folder,
set a responded already status in a property of the combined image files, when there is information added to a predetermined response field in the image of the reply document, and
set a response wait status in a property of the combined image files, when there is no information added to the predetermined response field in the image of the reply document.

4. The task request management apparatus according to claim 3, wherein the instructions, when executed, cause the hardware processors to:
when the image file including the image of the request form is registered in the folder, set a response wait status in a property of the image file to be registered, and
when the image file including the image of the reply document is registered in the folder, set a responded already status in a property of the combined image files.

5. A task request management method comprising:
creating data of a request form including a code image in which request content information is embedded, based on a request form format and user input information;
sending an image of the request form to a specified destination;
applying a first status to an image file including the image of the request form sent at the sending, and registering the image file including the image of the request form in a folder in a storage area, the folder corresponding to the request content information of the code image included in the request form;
receiving an image of a reply document in which information has been added to the request form and
applying a second status to an image file including the image of the reply document received at the receiving, and registering the image file including the image of the reply document in the folder in the storage area, the folder corresponding to the request content information of the code image included in the reply document;
combining two image files, when the image file including the image of the reply document is registered in the folder and the folder already includes the image file with the code image including the same request content information as the request content information included in the code image of the image file to be registered;
when the image file including the image of the request form is registered in the folder, a response wait status is set in a property of the image file to be registered, and
when the image file including the image of the reply document is registered in the folder,
a responded already status is set in a property of the combined image files, when there is information added to a predetermined response field in the image of the reply document, and a response wait status is set in a property of the combined image files, when there is no information added to the predetermined response field in the image of the reply document.

6. The task request management method according to claim 5, wherein when the image file including the image of the request form is registered in the folder, a response wait status is set in a property of the image file to be registered, and when the image file including the image of the reply document is registered in the folder, a responded already status is set in a property of the combined image files.

* * * * *